(12) United States Patent  (10) Patent No.: US 8,763,870 B2
Davis  (45) Date of Patent: Jul. 1, 2014

(54) ADJUSTABLE BICYCLE WHEEL RETAINER

(75) Inventor: Brian F. Davis, Portland, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 1417 days.

(21) Appl. No.: 11/501,929

(22) Filed: Aug. 8, 2006

(65) Prior Publication Data

US 2007/0164065 A1     Jul. 19, 2007

Related U.S. Application Data

(60) Provisional application No. 60/707,195, filed on Aug. 9, 2005.

(51) Int. Cl.
*B60R 9/048*     (2006.01)

(52) U.S. Cl.
USPC ............ 224/324; 224/323; 224/319; 224/924

(58) Field of Classification Search
USPC ......... 224/502, 324, 924, 497, 501, 505–509, 224/521, 531, 532, 536, 537, 319, 323, 570, 224/571; 411/433
See application file for complete search history.

(56) References Cited

U.S. PATENT DOCUMENTS

| | | | |
|---|---|---|---|
| 2,415,286 A | 2/1947 | Hyde | |
| 2,431,400 A | 11/1947 | Iverson | |
| 3,116,836 A | 1/1964 | McCauley | |
| 3,581,962 A | 6/1971 | Osborn | |
| 3,843,001 A | 10/1974 | Willis | |
| 3,861,533 A | 1/1975 | Radek | |
| 4,046,297 A | 9/1977 | Bland | |
| 4,126,228 A | 11/1978 | Bala | |
| 4,437,597 A | 3/1984 | Doyle | |
| 4,442,961 A | 4/1984 | Bott | |
| 4,524,893 A | 6/1985 | Cole | |
| 4,629,104 A | 12/1986 | Jacquet | |
| 4,700,873 A | 10/1987 | Young | |
| 4,702,401 A | 10/1987 | Graber | |
| 4,875,608 A | 10/1989 | Graber | |
| 5,025,932 A | 6/1991 | Jay | |
| 5,042,705 A | 8/1991 | Johansson | |
| 5,052,605 A | 10/1991 | Johansson | |
| 5,169,044 A | 12/1992 | Englander | |
| 5,230,449 A | 7/1993 | Collins | |
| 5,244,101 A | 9/1993 | Palmer | |
| 5,435,475 A | 7/1995 | Hudson | |
| 5,445,300 A | 8/1995 | Eipper | |
| 5,549,231 A | 8/1996 | Fletcher | |
| 5,692,659 A | 12/1997 | Reeves | |
| 5,701,628 A * | 12/1997 | Morad | ........................... 15/150 |
| 5,820,002 A | 10/1998 | Allen | |
| 5,833,074 A | 11/1998 | Phillips | |
| 5,862,966 A | 1/1999 | Mehls | |
| 5,944,198 A | 8/1999 | Ihalainen | |

(Continued)

OTHER PUBLICATIONS

U.S Patent and Trademark Office, Office action regarding U.S. Appl. No. 13/682,665, Jul. 22, 2013, 26 pages.

*Primary Examiner* — Brian D. Nash
*Assistant Examiner* — Corey Skurdal
(74) *Attorney, Agent, or Firm* — Kolisch Hartwell, P.C.

(57) ABSTRACT

A bike mount for securing a bike on a vehicle includes a wheel clamp and securing devices for mounting bikes of various types, dimensions, and styles in one or more tray portions, extending between a pair of crossbars or other support structures.

22 Claims, 6 Drawing Sheets

(56) References Cited

U.S. PATENT DOCUMENTS

| | | | |
|---|---|---|---|
| 5,988,403 A | 11/1999 | Robideau | |
| 6,244,483 B1 | 6/2001 | McLemore | |
| 6,460,743 B2 | 10/2002 | Edgerly | |
| 6,648,300 B2 | 11/2003 | Chamoun | |
| 6,868,998 B2 | 3/2005 | Dean | |
| 2003/0071097 A1* | 4/2003 | Dean | 224/319 |

* cited by examiner

ADJUSTABLE BICYCLE WHEEL RETAINER

CROSS-REFERENCES

This application is based upon and claims priority under 35 U.S.C. §119 from U.S. Provisional Patent Application Ser. No. 60/707,195, filed Aug. 9, 2005, which is incorporated herein by reference in its entirety for all purposes.

FIELD OF THE INVENTION

The present invention is related to bike mounts. More specifically, the present invention is related to bike mounts that secure a bicycle to a vehicle rack.

BACKGROUND

Top-mounted vehicle racks provide a versatile platform for transporting bicycles, skis, snowboards, boats, cargo boxes, gear racks, and other items. Such racks may include crossbars that extend side-to-side across the top of a vehicle. The crossbars typically are supported on each side of the vehicle's roof by a tower, where the length of each crossbar and the distance between crossbars depend on factors such as the shape and size of the vehicle's roof. The towers supporting the rack crossbars are securely fastened to the vehicle in some manner, to prevent the rack from slipping during use.

With the growing popularity of bicycling as a recreational activity, vehicles are often equipped with racks specifically configured to transport bicycles. Various systems have been developed to secure and stabilize bicycles on vehicle-mounted crossbars. One such system utilizes a fork block mounted to one of the bars with a skewer extending therethrough to receive and grip the front forks of a bicycle. Typically in such systems, a wheel tray extends from the fork block to the other crossbar to receive the rear tire of the bicycle. While these systems typically securely hold the bicycle in place, they have the disadvantage that the user must remove the front wheel of the bicycle before placing it in the rack, and then secure the front wheel separately to the rack or store it inside the vehicle.

Another common system used to attach a bicycle to vehicle-mounted crossbars secures both wheels of the bicycle to a wheel tray extending between the crossbars. This has the advantage that the user may secure the bicycle to the rack without removing the front wheel of the bicycle, but in such systems, a mechanism other than a fork block must be provided to secure the front end of the bicycle to the rack. Such mechanisms may include various combinations of straps, clamps, and stabilizing bars that attach to various points on the bicycle frame and/or wheels.

Frame attachment may effectively secure the bicycle to the vehicle rack. However, the rigidity of the bicycle frame may transfer potentially damaging motions from the vehicle to the bicycle. As a result, the frame may be damaged structurally. In addition, points of carrier engagement on the frame may be damaged cosmetically, that is, dented or scratched.

Wheel attachment overcomes some of the problems associated with frame attachment, because bicycle tires have an inherent shock-absorbing ability, which generally reduces the effects of sudden vehicle motions on an attached bicycle. However, some wheel-based carriers do not grip a bicycle wheel tightly enough to safely carry a bicycle on a vehicle roof at high speeds. Other wheel-based carriers are not designed for easy bicycle loading on a vehicle roof. As a result, it may be difficult for one person to position and balance a bicycle on the carrier as the bicycle is attached. Therefore, a vehicle-mounted bicycle carrier is needed that is easily loaded with a bicycle and that holds a wheel of the bicycle securely and effectively.

SUMMARY OF THE INVENTION

A bike mount for securing a bicycle to a vehicle rack is provided. The bike mount includes arms that pivot together to cooperatively engage a bicycle wheel and retain the wheel securely in place. The bike mount may be configured to include an adjustable tensioning device for securing one of the arms behind the bicycle wheel in a convenient and adjustable manner.

DETAILED DESCRIPTION

Examples of preferred bike mount designs are described below. It will be apparent that many variations and modifications of the described devices, and assemblies are enabled and included within the scope of the claims listed below. The disclosure may also include multiple inventions. Therefore, the claims should not be interpreted as limiting the scope of patentable subject matter in the disclosure.

Figure 1:
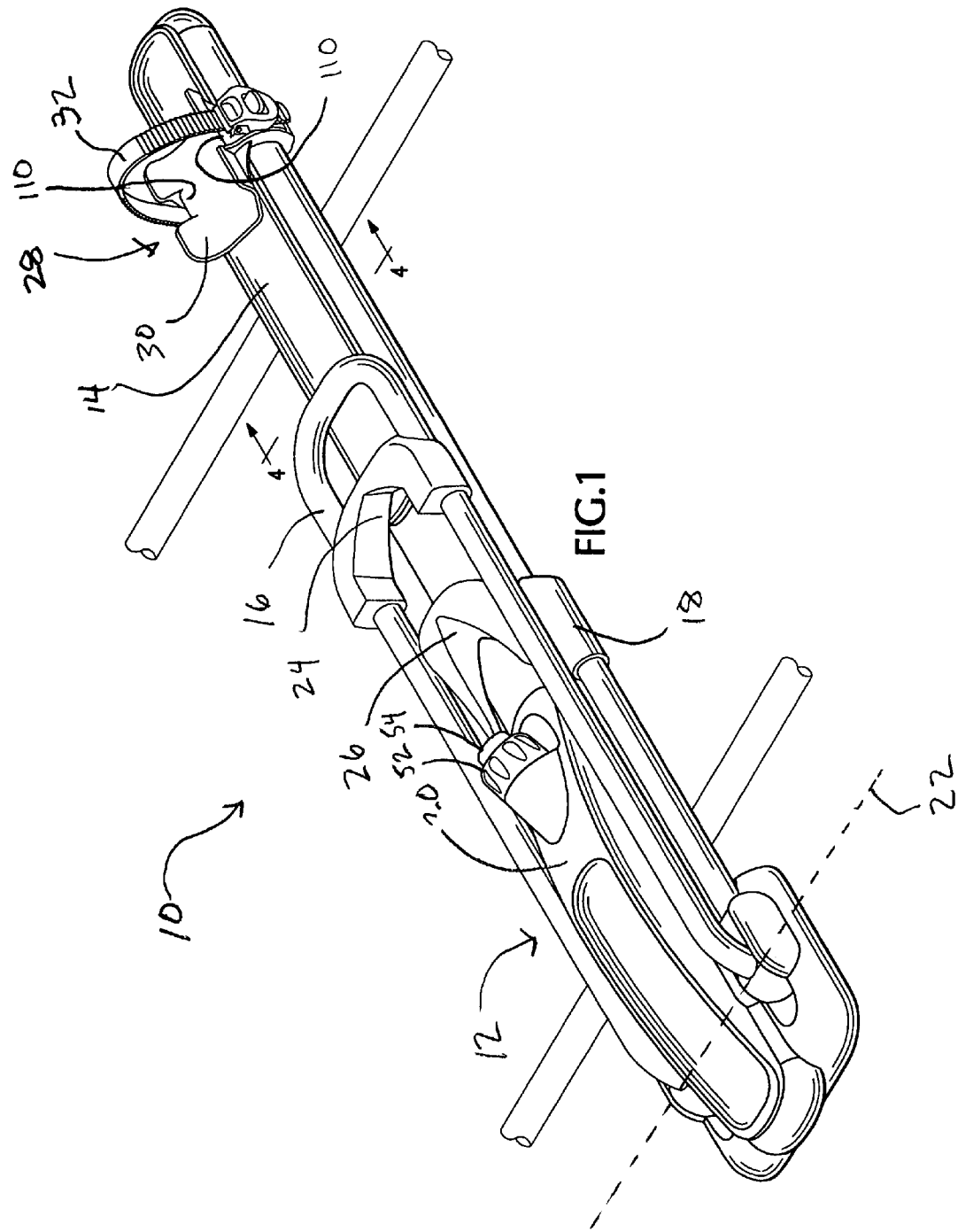
FIG. 1 is a perspective view of a bike mount including an adjustable bicycle wheel retainer, showing the bicycle wheel retainer in its collapsed configuration.

FIG. 1 shows a bike mount 10 constructed according to aspects of the present invention. Although not depicted in the drawings, bike mount 10 may be attached to a vehicle rack carrier positioned above the roof of a vehicle, or the mount may be attached in any other suitable location, such as in the bed of a truck. The carrier to which the bike mount is attached generally includes towers that couple the carrier to the vehicle, and crossbars which are linked to the towers and which extend transverse to the vehicle. The bike mount may be positioned above the crossbars and may be attached to the crossbars by any suitable method, typically using a clamp mechanism or other adjustable fastener.

Bike mount 10 generally includes a bicycle wheel retainer assembly 12 for holding a first wheel, usually a front wheel, of a bicycle, and a tray assembly 14 that supports a second wheel, usually a rear wheel of the bicycle. The retainer assembly includes a first arm or front wheel stop 16, a second arm or rear wheel stop 18, and a base or support structure 20. First arm 16 may be pivotably attached to support structure 20 at an axis of rotation 22, and extends generally radially from the axis of rotation. Similarly, second arm 18 also may be pivotably attached at axis of rotation 22, or at a separate, generally parallel axis, and also extends generally radially from the axis. Support structure 20 may be coupled to tray 14, which is aligned generally orthogonal to pivot axis 22.

Figure 2:
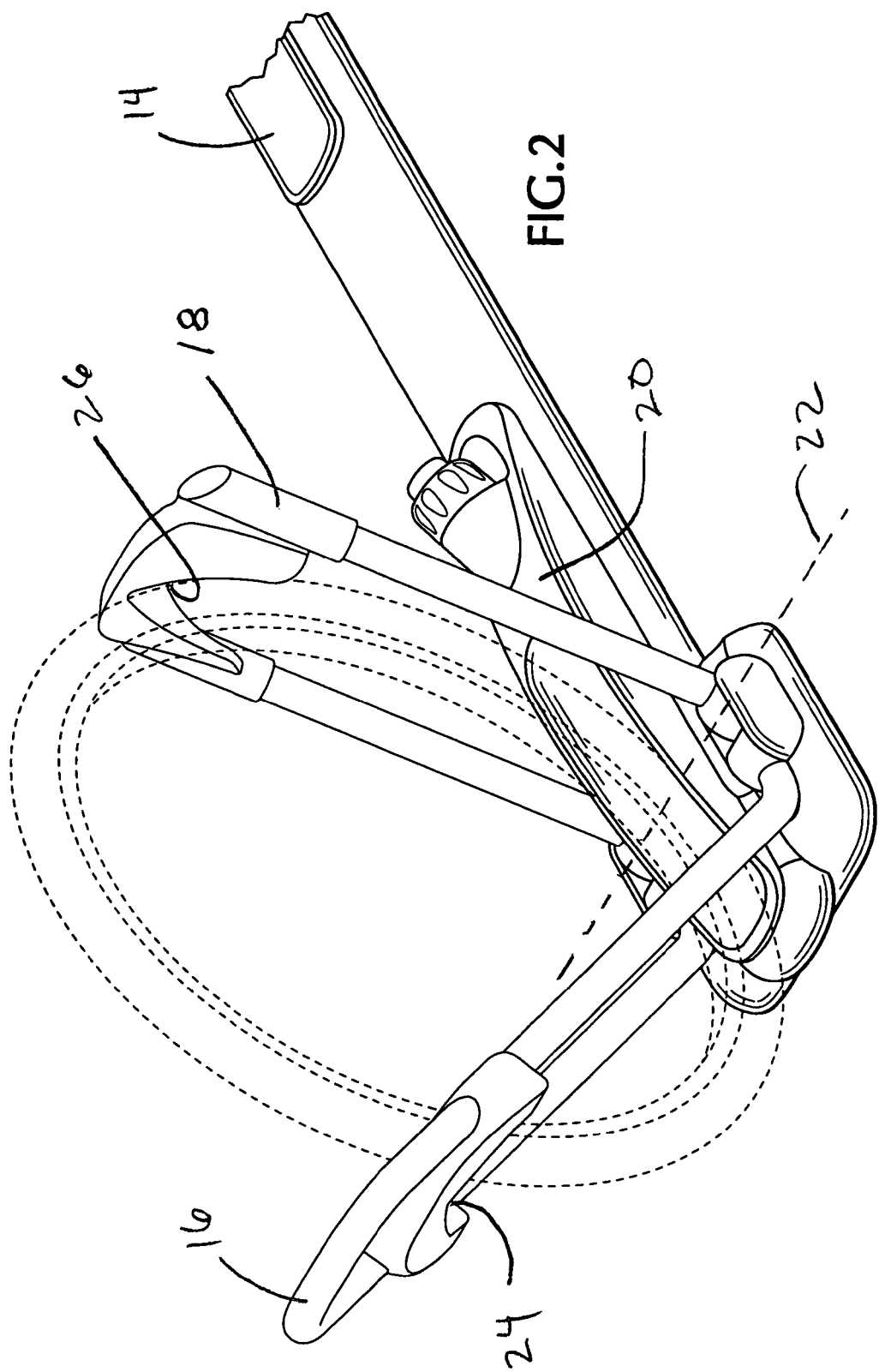
FIG. 2 is a partial perspective view of the bike mount of FIG. 1, showing the bicycle wheel retainer retaining a bicycle wheel in dashed lines.

In FIG. 1, arms 16 and 18 are shown in their stowed positions. However, these arms are each pivotable from their stowed position to a retaining position for preventing removal of a bicycle wheel from between the first and second arms. More specifically, as shown in FIG. 2 arms or wheel stops 16 and 18 are configured such that once a wheel of a bicycle is properly positioned on support structure 20, the arms are rotated to their retaining positions, such that the front and rear of the wheel are supported by the front and rear wheel stop, i.e. by the first and second arms, respectively. Suitable materials for the wheel stops may include a sturdy, lightweight material such as an aluminum or other metal alloy, a polymeric material, or a combination thereof.

Arms 16 and 18 may have any structure that allows them to stably engage a bicycle wheel. As shown in FIGS. 1 and 2, each arm may have generally parallel, spaced supports extending from pivot axis 22 or support structure 20, the supports leading to a generally arch-shaped cross member that distally joins them together. To facilitate stable engagement of a wheel, the cross member of each arm may include a v-shaped notch or channel such as channels 24 and 26 depicted in FIGS. 1 and 2. Each v-shaped channel may be configured to cause self-centering, stable engagement of the bicycle wheel by the respective arm, when the arm makes contact with the wheel. Furthermore, one or both of the cross members may be movable along its supports, so that one or both of the v-shaped channels may have an adjustable location relative to the support structure, to accommodate wheels of various diameters.

Base or support structure 20 is any structure or assembly that defines spatial positions of arms 16 and 18 relative to a vehicle or vehicle rack carrier. Tray 14 is any structure capable of supporting and positioning a second wheel of a bicycle when the first wheel is engaged by wheel retainer assembly 12. As shown in FIGS. 1 and 2, tray 14 may have a channel-like structure with a bottom portion that supports a wheel of a bicycle, and side walls that limit lateral movement of the wheel. As shown in FIG. 1, a retaining mechanism 28 may be optionally and removably attached to tray 14, and may include an insert 30 and/or a retaining strap 32 for more secure support and attachment of a wheel to the tray. A first end portion of tray 14 may be attached directly to a portion of retainer assembly 12, such as support structure 20, while a middle or second end portion may be attached to a crossbar (not shown).

Retainer assembly 12 also includes an adjustable tensioning device that will be described in greater detail below. The tensioning device includes a rotatable tensioning knob 52, and a tension release button 54, each of which is visible in FIG. 1.

Figure 3:
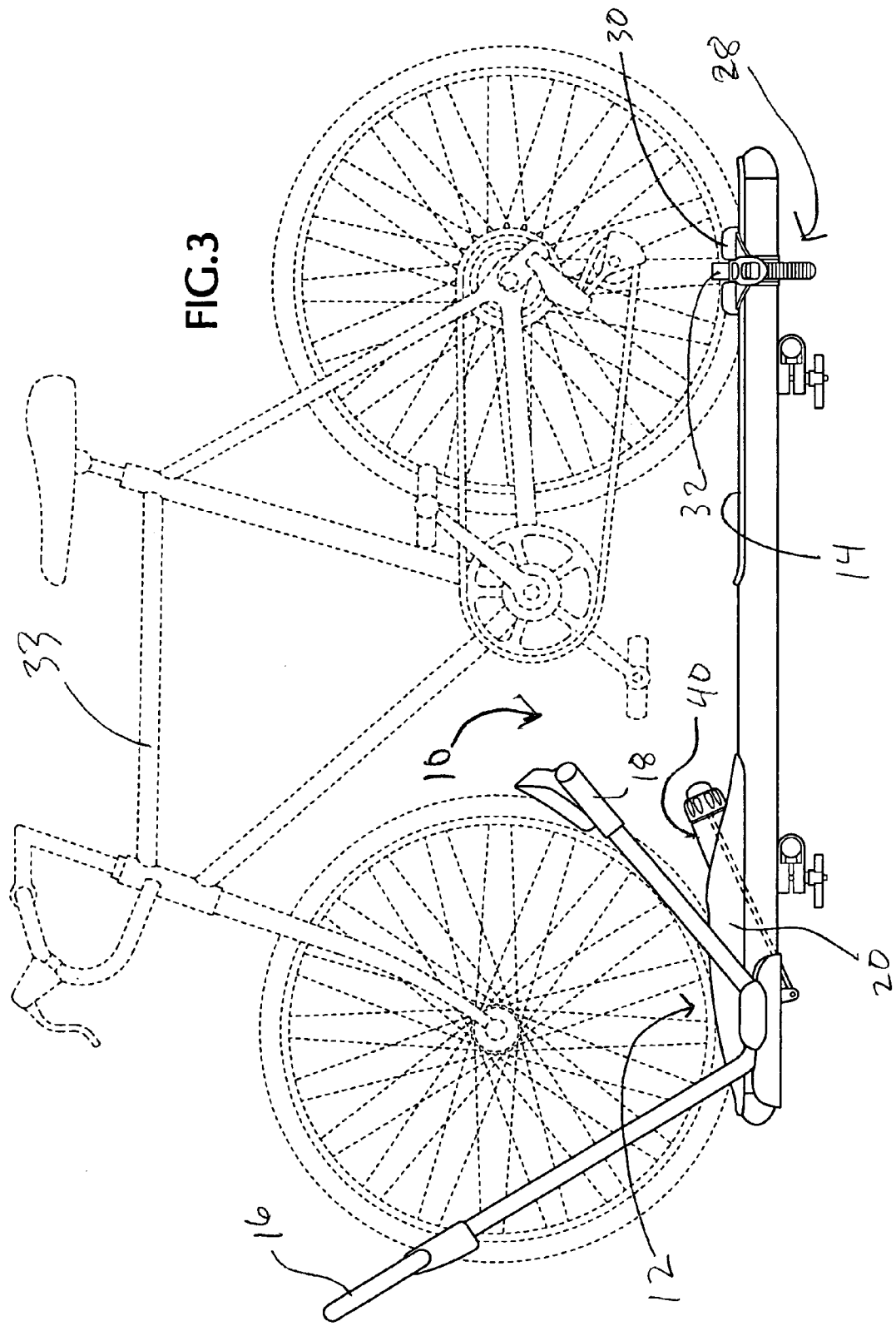
FIG. 3 is a side view of the bike mount shown in FIGS. 1 and 2, securing a bike in dashed lines.

FIGS. 2 and 3 show bike mount 10 with bicycle wheel retainer assembly 12 retaining a bicycle wheel. As indicated, first arm 16 supports the front side of the wheel, and second arm 18 supports the rear side of the wheel. To operate the retainer assembly, first arm 16 is typically rotated from its stowed position to its retaining position before the wheel is positioned on support structure 20. Then the wheel is positioned on the support structure, and second arm 18 is rotated from its stowed position to its retaining position, so that the wheel is retained between the two arms. First arm 16 typically has one or a limited number of retaining positions that may be determined, for example, by mechanical limits on the rotational range of the arm. On the other hand, second arm 18 typically has a plurality of retaining positions, and—via an adjustable tensioning device—may be unidirectionally rotated toward the wheel to position the arm in the retaining position for that particular wheel. An embodiment of such an adjustable tensioning device will be described in more detail below.

Figure 4:
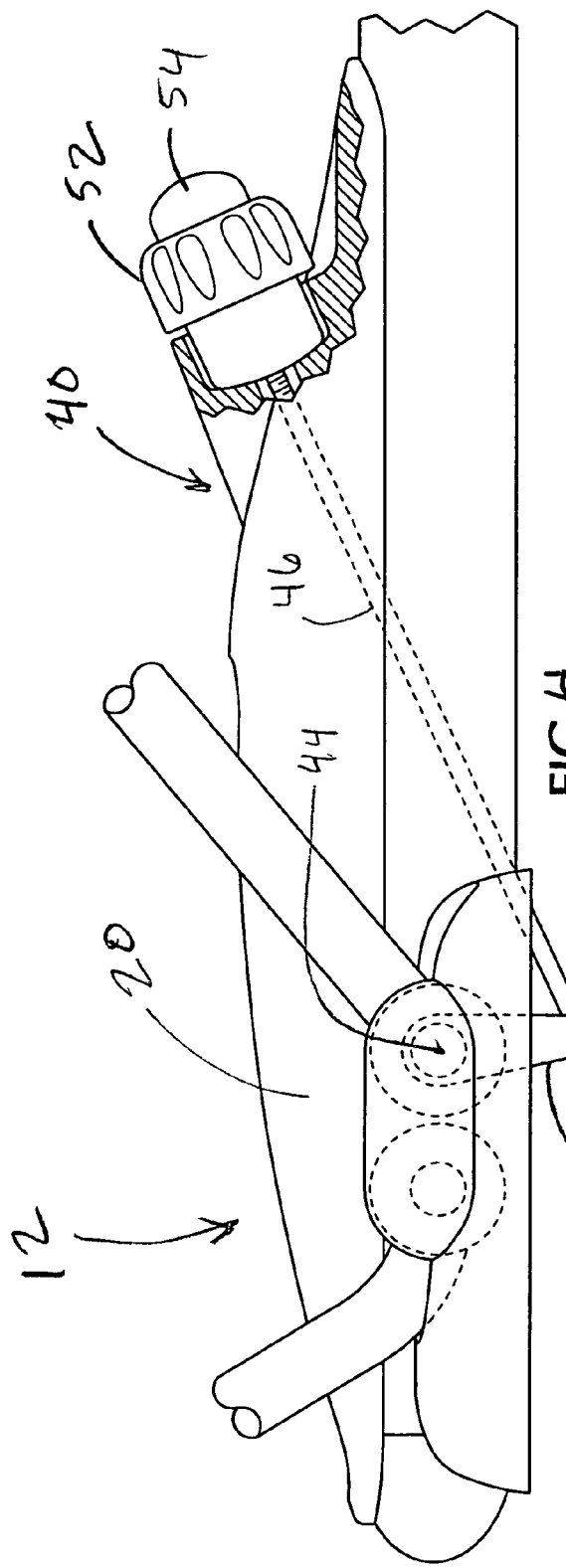
FIG. 4 is a partial cut-away view of a front wheel support showing components of a tightening device.

FIG. 4 shows a sectional view of support structure 20 of wheel retainer assembly 12, illustrating details of an embodiment of an adjustable tensioning device 40, which is configured to secure rear wheel stop or second arm 18 behind a bicycle wheel in a convenient and adjustable manner. As indicated in FIG. 4, tensioning device 40 includes a lever 42, one end of which is attached to a pivot 44 corresponding to axis of rotation 22 of the second arm, and a threaded rod 46 attached to the other end of lever 42 by a pin 48. As shown in more detail in FIGS. 5 and 6, rod 46 extends distally from lever 42 through a rod-receiving portion or threaded pawl 50, which is attached to a rotatable knob 52. Together, rod 46, pawl 50, and knob 52 act to allow unidirectional rotation of arm 18, to position arm 18 in close proximity or adjacent to the wheel to be retained.

More specifically, rod 46 and pawl 50 act together as a first tensioning mechanism for coarse positioning of the second arm in the retaining position. To operate the first, coarse tensioning mechanism of tensioning device 40, front wheel stop or first arm 16 is rotated into its retaining position, and a bicycle is placed into position with its front wheel against the top of support structure 20. Rear wheel stop or second arm 18 is raised behind the front wheel, rotating pivot 44 and lever 42, and thus forcing threaded rod 46 into pawl 50 until the pawl engages one or more of the threads of the rod. In other words, rotation of the second arm causes rotation of the lever, and rotation of the lever causes motion of the rod into the pawl. Pawl 50 is designed to allow only unidirectional (tightening) motion of rod 46, so that the rod can move further into the pawl by discrete amounts, but cannot be removed until a release mechanism is activated. In this manner the rear wheel stop can be raised until it contacts the bicycle wheel, at which point the rear wheel stop is approximately correctly positioned to secure the wheel.

Once the second arm is approximately correctly positioned at the rear of the wheel to be retained, knob 52 may be used in conjunction with rod 46 as a second tensioning mechanism for fine positioning of the rear wheel stop or second arm in the retaining position. Knob 52 is attached pawl 50, and is configured to cause rotation of the pawl when the knob is rotated. Thus, clockwise rotation of the knob draws the rod further into the pawl due to rotational engagement of the external threads of the rod with the internal threads of the pawl. This has the effect of further rotating pivot 44, and moving second arm 18 into closer, more secure, engagement with the retained bike wheel. In other words, rotating the knob clockwise has the effect of pushing the rear wheel stop against the bicycle wheel and further securing the wheel within the bike mount. Conversely, counterclockwise rotation of the knob has the effect of loosening the engagement of the second arm against the rear of the wheel.

Figure 5:
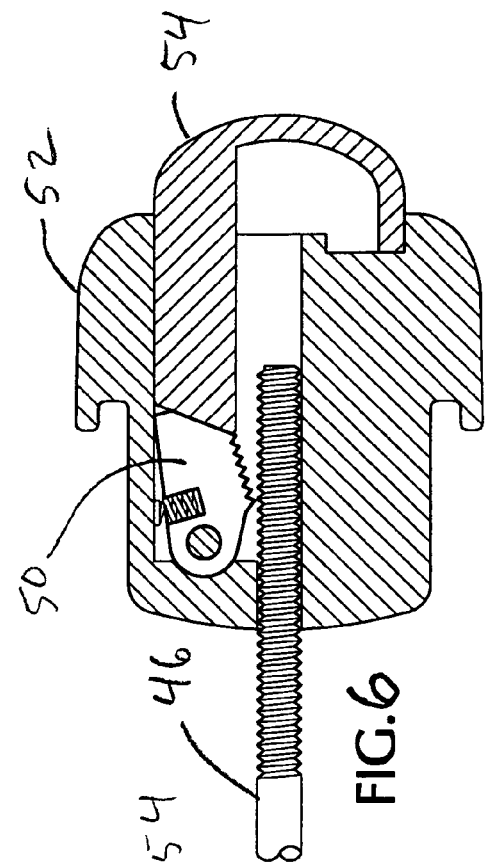
FIGS. 5 and 6 are partial sectional views of a tightening device on a bike mount for securing a clamp around a wheel.
Figure 6:
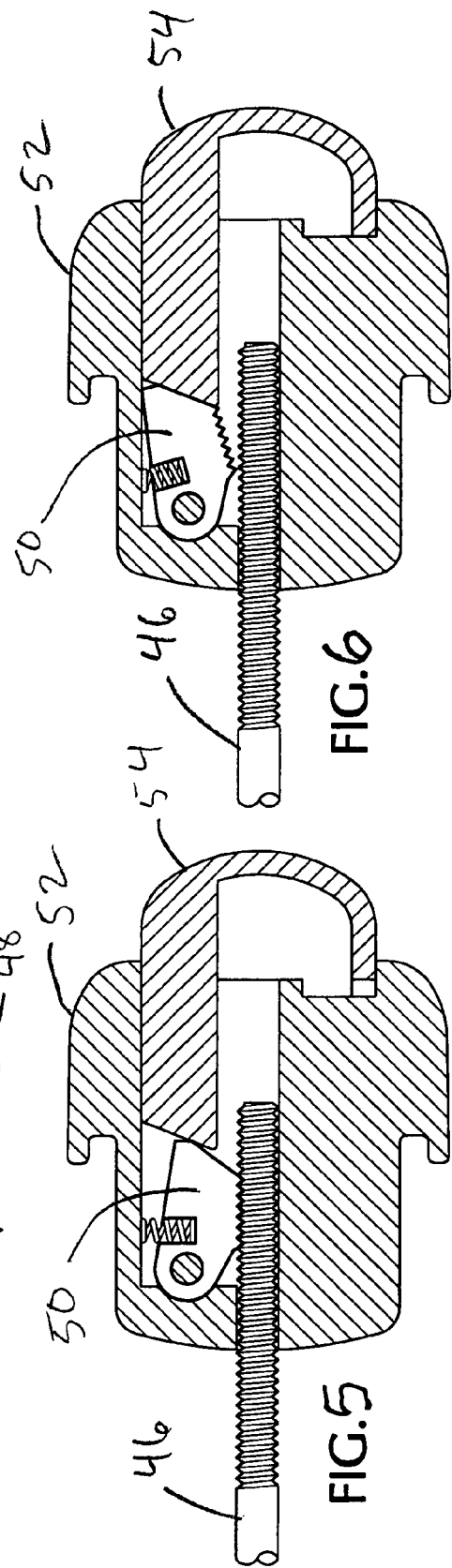

A release mechanism, such as push button 54, may allow the user to disengage pawl 50 from rod 46 when activated, for example by spreading the pawl until its internal diameter is greater than the external diameter of the rod, or by otherwise repositioning the pawl to a position in which its internal threads no longer engage the external threads of the rod. In any case, the release mechanism is configured to allow bidirectional rotation of the second arm when the release mechanism is activated. Thus, once the release mechanism is activated, the second arm or rear wheel stop may be rotated away from the bicycle wheel, and the bicycle may be removed from the mount. FIG. 5 shows a cross section through knob 54 in which pawl 50 is engaging threads on rod 46 permitting unidirectional movement of rod 46 into the rod receiving portion. FIG. 6 shows pawl 50 disengaged from rod 46 in response to depression of button 54, permitting bidirectional movement (release) of rod 46 from the rod receiving portion.

Figure 7:
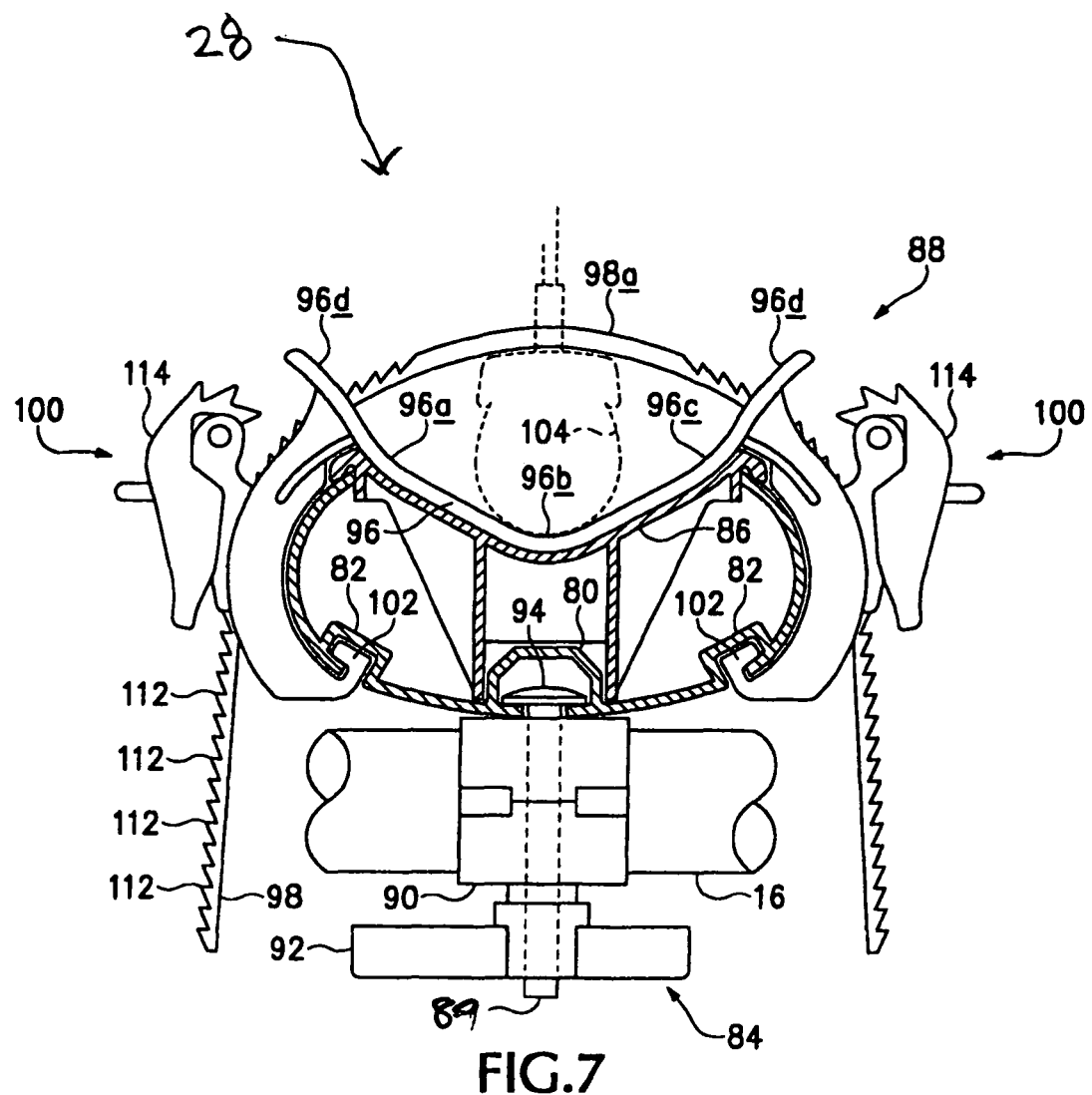
FIGS. 7-9 show cross sectional views through adjustable wheel securing devices for a bike mount.
Figure 8:
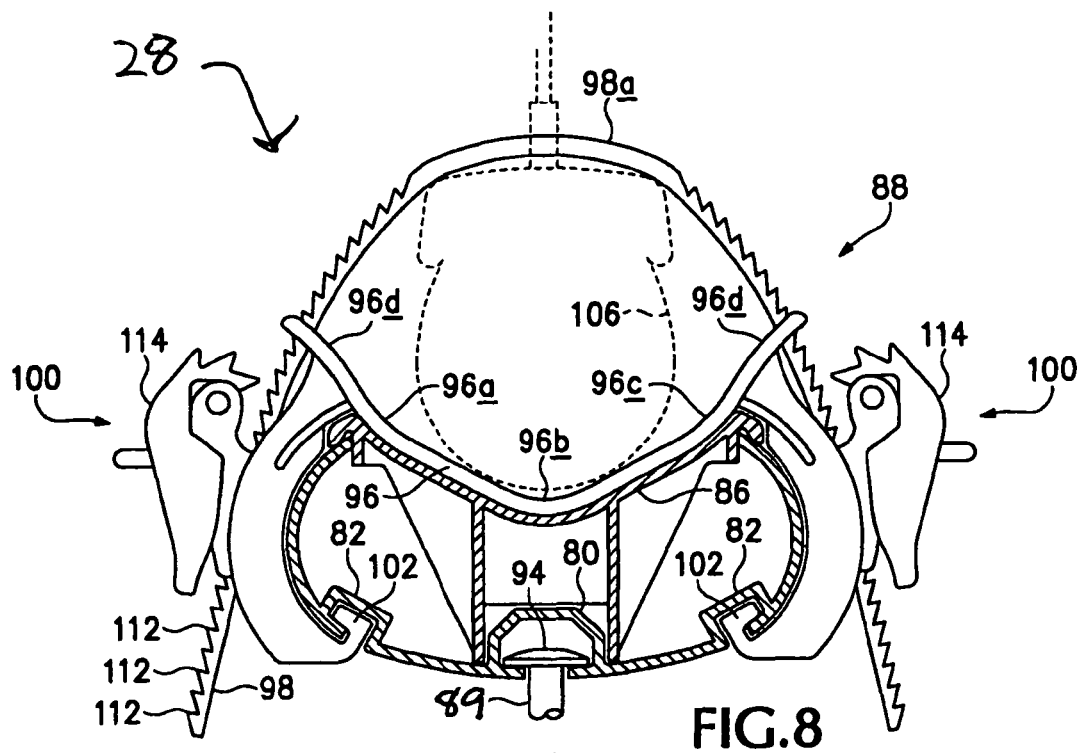
Figure 9:
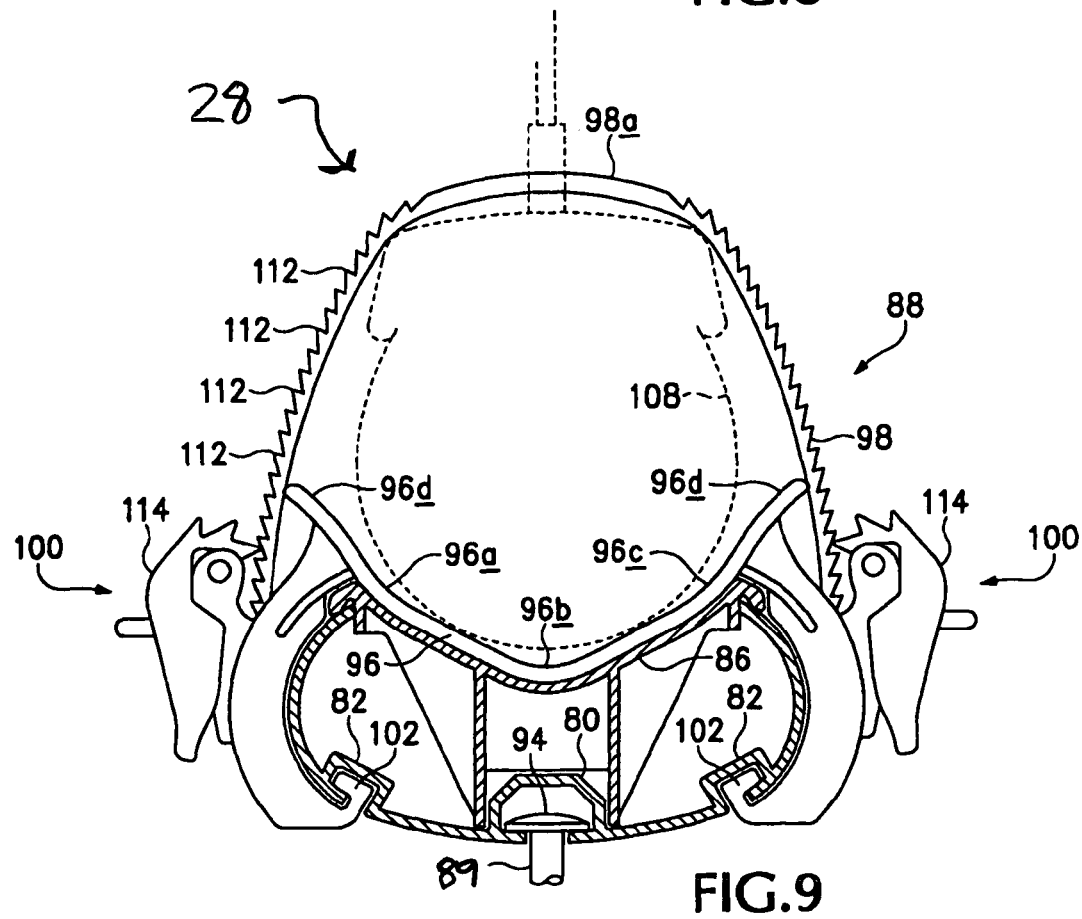

FIGS. 7-9 show cross sections through tray 86 (analogous to wheel tray 14 in previous figures) and wheel support device, or "taco" 96 (analogous to taco 28 in previous figures). Wheel support 28 may include any device adapted to receive and secure the rear wheel of a bicycle. The wheel support may be constructed of any materials consistent with its function. As shown in FIGS. 1, and 7-9, wheel support 28 may include central track 80, one or more laterally spaced tracks 82, an attachment member 84, an elongate wheel tray 86, and/or a securing mechanism 88.

As shown in FIGS. 7-9, central track 80 may be positioned on the bottom and in the central portion of the bicycle carrier, and may extend parallel to the bicycle carrier's longitudinal axis along a substantial portion of the bicycle carrier's length. Similarly, one or more laterally spaced tracks 82 may be positioned on the bottom of the bicycle carrier, may be laterally spaced relative to the center track 80, and may extend parallel to the bicycle carrier's longitudinal axis along a substantial portion of the bicycle carrier's length. The tracks may provide means for slidably attaching other components of the wheel support 28 to the bicycle carrier, as described below.

As shown in FIG. 7, attachment member 84 may include any mechanism for removably attaching the wheel support portion of the bicycle carrier to crossbar 16. The attachment member may be positioned on the underside of bicycle carrier 14, and may include threaded bolt 89, clamping member 90, and securing device 92. Threaded bolt 89 may include bolt head 94 dimensioned to slidably engage central track 80, so as to enable a user to adjust the position of attachment member 84 relative to the length of the bicycle carrier. Clamping member 90 may include any device that engages threaded bolt 89, and that clamps about crossbar 16. Securing device 92 may include any device for threadably engaging threaded bolt 89. Securing device 92 may be fully tightened upwards against clamping device 90, thus securing the clamping device about crossbar 16, and bolt head 94 in a fixed position relative to central track 86.

Wheel tray 86 may include any mechanism adapted to selectively support a rear wheel of a bicycle. For example, as shown in FIGS. 1, and 7-9, the wheel tray may be concave, and may provide a space along which securing mechanism 88 may be translationally adjusted. A user may thereby position securing mechanism 88 closer or further from the front tire fastener, thereby enabling a user to selectively secure the rear wheels of different bicycles having varied wheelbases.

Securing mechanism 88 may include any mechanism adapted to selectively secure the rear wheel of a bicycle to wheel tray 86. As shown in FIGS. 7-9, securing mechanism 88 may include receiver 96, strap 98, one or more adjustment mechanisms 100, and one or more engagement members 102.

Receiver 96 (also referred to as a housing, or a "taco") may include any mechanism for receiving and retaining bicycle wheels of various shapes and sizes. Receiver 96 may have laterally extending side walls shaped in a manner that defines one or more concave portions, such as concave portions 96a-c, and one or more convex portions, such as ear portions 96d, for receiving and retaining bicycle tires having different diameters. For example, FIG. 7 shows receiver 96 engaged with road bike's tire 104, FIG. 8 shows the receiver engaged with mountain bike's tire 106, and FIG. 9 shows the receiver engaged with beach cruiser's tire 108. The side walls of receiver 96 may also include one or more notches 110 (shown in FIG. 1), positioned to receive a portion of strap 98 for securing the rear wheel, as discussed below. Notches 110 may be configured to allow a user to draw the strap closer to the bottom of receiver 96 than would be possible without the notches due to the receiver's extended ear portions 96d. The notches thereby may allow a user to engage and secure bicycle wheels of various shapes and sizes without requiring an adapter.

Strap 98 may include any mechanism for securing the rear wheel of a bicycle to the receiver 96, and may include securing portion 98a that extends across a portion of the bicycle's rear wheel. The strap may be formed integrally with or separately from receiver 96. The strap may be configured to slidably engage the one or more adjustment mechanisms 100, and may be positioned for reception by the one or more notches 110. The strap may include one or more teeth, such as teeth 112, which extend laterally across the strap.

Adjustment mechanism 100 may include any mechanism for tightening and loosening the strap around the rear wheels of a bicycle. For example, the adjustment mechanism may be positioned adjacent to the lateral side walls of the receiver 96 for selectively adjusting the length of the strap's securing portion 96a. The adjustment mechanism may include a buckle, such as those disclosed in U.S. Pat. No. 6,561,398 and/or U.S. Pat. No. 6,283,310, the disclosures of which are herein incorporated by reference in their entirety for all purposes. The adjustment mechanism may also include any type of buckle having a ratcheting assembly for selectively engaging the strap's teeth 112, such as buckles made by Everest or Burton for use in snowboard bindings.

The one or more engagement members 102 may be configured to slidably engage the one or more laterally spaced tracks 82, thereby enabling a user to adjust the position of the securing mechanism 88 along the wheel tray's longitudinal axis.

The various structural members disclosed herein may be constructed from any suitable material, or combination of materials, such metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance. For example, the embodiments described above are shown with a particular clamp device being used to clamp the front wheel of a bike, and a different binding device for securing the rear wheel of a bike. However, the same or similar device may be used and/or reconfigured for use on front and rear wheels interchangeably.

I claim:
1. A bicycle mount for carrying a bicycle on a vehicle rack, including:
    a support structure having first and second ends, the support structure being configured to be attached to the vehicle rack;
    a first arm coupled to the support structure proximate the first end;

a second arm pivotally attached to the support structure proximate the first end, the second arm pivotable about an axis of rotation between a stowed position and a retaining position in which the first and second arms engage a same bicycle wheel to prevent removal of the wheel from between the first and second arms; and an adjustable tensioning device governing rotation of the second arm between stowed and retaining positions, the adjustable tensioning device including a lever having a first end coupled to the second arm and a second end coupled at a position below the first end to a rod of the tensioning device, wherein urging the lever generally toward the second end of the support structure urges the second arm generally away from the second end of the support structure.

2. The bicycle mount of claim 1, wherein the rod is configured to move unidirectionally into a rod-receiving portion of the mount when the second arm is rotated from the stowed position towards the retaining position.

3. The bicycle mount of claim 2, wherein the rod-receiving portion includes a pawl configured to engage at least one thread of the rod.

4. The bicycle mount of claim 3, wherein the tensioning device includes a knob configured to draw the rod into the pawl when the knob is rotated.

5. The bicycle mount of claim 4, wherein the pawl is internally threaded, and wherein the knob is configured to cause rotation of the pawl when the knob is rotated, thereby drawing the rod into the pawl.

6. The bicycle mount of claim 1, wherein rotation of the second arm causes rotation of the lever, and wherein rotation of the lever causes motion of the rod into a pawl.

7. The bicycle mount of claim 6, wherein a first end portion of the lever is attached to the second arm at a first attachment point through which the axis of rotation of the second arm passes, and wherein a second end portion of the lever is attached to a proximal end of the rod at a second attachment point situated beneath the first attachment point.

8. The bicycle mount of claim 1, further comprising a release mechanism configured to allow rotation of the second arm toward the retaining position and toward the stowed position when the release mechanism is activated.

9. The bicycle mount of claim 8, wherein the release mechanism is configured to disengage a pawl from the rod when activated.

10. The bicycle mount of claim 8, wherein the tensioning device includes a pawl that is rotatable between a first position in which it is engaged with the rod, and a second position in which it is disengaged from the rod, and wherein the release mechanism includes a button extending through a bore of the knob, operatively connected to the pawl and configured to cause the pawl to rotate from the first position toward the second position when the button is depressed.

11. The bicycle mount of claim 10, wherein the pawl is spring-biased toward the first position.

12. The bicycle mount of claim 1, wherein the first and second arms each include an arch-shaped distal portion for engaging a wheel.

13. The bicycle mount of claim 12, wherein at least one of the arch-shaped distal portions includes a v-shaped channel.

14. The bicycle mount of claim 13, wherein the v-shaped channel is configured to cause self-centering, stable engagement of the wheel by the arm.

15. The bicycle mount of claim 1, wherein the bicycle wheel is a first vehicle wheel, wherein the support structure includes a wheel tray having a first portion for supporting the first vehicle wheel and a second portion for supporting a second vehicle wheel, and wherein the second portion is slidable relative to the first portion.

16. The bicycle mount of claim 1, wherein the tensioning device includes a first tensioning mechanism for coarsely adjusting the retaining position of the second arm, and a second tensioning mechanism for finely adjusting the retaining position of the second arm.

17. The bicycle mount of claim 1, wherein a substantial portion of the rod is enclosed within a channel of the bicycle mount.

18. The bicycle mount of claim 1, wherein the first arm is coupled to the support structure at a first pivot point and the second arm is pivotally attached to the support structure at a second pivot point different from the first pivot point.

19. The bicycle mount of claim 1, wherein the rod is connected to a knob that is rotatable to adjust positioning of the second arm in the retaining position.

20. The bicycle mount of claim 1, wherein the rod is connected to a knob configured for adjusting rotation, the knob being situated above a top portion of the support structure.

21. The bicycle mount of claim 20, wherein the rod has a first end connected to the knob, a second end connected to the lever, and a substantial middle portion enclosed within a channel proximate the second arm.

22. The bicycle mount of claim 21, wherein a majority of the length of the rod is housed within the channel of the bicycle mount when the arms are in the retaining position.

\* \* \* \* \*